United States Patent
Kase et al.

(10) Patent No.: US 6,937,453 B2
(45) Date of Patent: Aug. 30, 2005

(54) DIRECTIONAL COMPARISON DISTANCE RELAY SYSTEM

(75) Inventors: Takahiro Kase, Tokyo (JP); Hidenari Amo, Tokyo (JP); Yasutaka Sonobe, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 207 days.

(21) Appl. No.: 10/347,454

(22) Filed: Jan. 21, 2003

(65) Prior Publication Data

US 2003/0151867 A1 Aug. 14, 2003

(30) Foreign Application Priority Data

Feb. 6, 2002 (JP) ........................................ 2002-029768

(51) Int. Cl.[7] .............................................. H02H 3/00
(52) U.S. Cl. ........................................................ 361/81
(58) Field of Search ............................. 361/80, 81, 83, 361/67, 85

(56) References Cited

U.S. PATENT DOCUMENTS

| | | | | |
|---|---|---|---|---|
| 4,528,611 A | * | 7/1985 | Udren | 361/81 |
| 4,896,241 A | | 1/1990 | Li et al. | 361/66 |
| 6,101,075 A | * | 8/2000 | Roberts | 361/85 |
| 6,307,723 B1 | * | 10/2001 | Hindle et al. | 361/63 |
| 6,341,055 B1 | * | 1/2002 | Guzman-Casillas | 361/81 |
| 6,476,613 B2 | * | 11/2002 | Saha et al. | 324/522 |
| 6,483,680 B1 | * | 11/2002 | Kulidjian et al. | 361/36 |

FOREIGN PATENT DOCUMENTS

JP  7-322476  12/1995

* cited by examiner

*Primary Examiner*—Brian Sircus
*Assistant Examiner*—Boris Benenson
(74) *Attorney, Agent, or Firm*—Oblon, Spivak, McClelland, Maier & Neustadt, P.C.

(57) ABSTRACT

A directional comparison distance relay system for protecting a power transmission line. The relay system comprises a fault detection unit which includes a directional distance relay element for deciding whether a fault is in forward or reverse directions; a short-circuit distance relay element for deciding whether a fault is within a protection zone by distance calculation; and an evolving fault detecting unit for deciding an evolving fault when a forward earth fault directional relay in a single phase and a reverse directional relay in a phase are in operation. The relay system further comprises a block unit for blocking trip of a circuit breaker at a near end due to the short-circuit distance relay, and for blocking permissive trip signal to a circuit breaker at the far end, based on an operation of the evolving fault detecting unit.

17 Claims, 9 Drawing Sheets

DIRECTIONAL COMPARISON DISTANCE RELAY SYSTEM

CROSS-REFERENCE TO RELATED APPLICATIONS

This application is based upon and claims the benefits of priority from the prior Japanese Patent Application No. 2002-029768, filed on Feb. 6, 2002; the entire content of which is incorporated herein by reference.

BACKGROUND OF THE INVENTION

This invention is related generally to a directional comparison distance relay system used in a three-phase AC electric power transmission system, and more specifically, to such a relay system with prevention of over-tripping due to multiple faults.

FIG. 11 shows a typical parallel three-phase AC electric power transmission system with protection relay systems. A protection zone 10 of a length of parallel three-phase AC electric power transmission lines 12 is set between first and second substations 14a and 14b, respectively. The first and second substations 14a and 14b have protection relay systems 16a and 16b, circuit breakers 18a and 18b, voltage transformers 20a and 20b, and current transformers 22a and 22b, respectively. The protection relay systems 16a and 16b include transmission devices 24a and 24b, respectively.

FIG. 8 is a simplified diagram showing a trip sequence logic of a typical directional comparison distance relay system. In this figure, the numeral 300 represents a receiver section of a transmission device, which receives and outputs a permissive trip signal sent from the far end (opposite end) of the protective section of the electric power transmission line. The numeral 302 represents a Zone 1 element of a short-circuit distance relay which operates for a short-circuit fault occurring in the forward protection direction from the local end and within about 80 to 90% of the whole length of the protection zone. Trips due to the Zone 1 element does not require permissive trip signals from the far end.

The numeral 303 represents a forward short-circuit directional distance relay which operates when a short-circuit fault has occurred forward in the protection direction. Note that "short-circuit distance relay" in this specification means a combination of a Zone 1 element 302 of a short-circuit distance relay and a forward short-circuit directional distance relay 303.

The numeral 304 represents an "AND" gate logic which permits a trip when the output signal of the forward short-circuit directional distance relay 303 and a permissive trip signal 301 from the far end are received. The numeral 305 represents an "OR" gate logic which becomes TRUE when the Zone 1 element 302 of the short-circuit distance relay and the "AND" gate logic 304 become TRUE.

The numeral 306 represents a trip condition of the short-circuit distance relay. This condition 306 is added as an input to the "AND" gate logics 307 and 308, because there are some cases where the circuit breaker should preferably prohibited to be tripped/opened even when the Zone 1 element 302 of the short-circuit distance relay and the forward short-circuit directional distance relay 303 are in operation.

The numeral 309 represents a trip signal for the circuit breaker by the short-circuit distance relay. The numeral 310 represents a permissive trip signal, which is sent to the far end through a signal send port 311 of a transmission device.

The trip condition 306 of the short-circuit distance relay will be described below in detail referring to FIG. 9.

The earth fault relay has a similar circuit breaker trip sequence logic. The numeral 312 represents a first step of the earth fault distance relay, the numeral 313 represents a forward earth fault directional relay, the numeral 314 represents an "AND" gate logic, the numeral 315 represents a trip condition of the earth distance relay, the numeral 316 represents an "OR" gate logic, the numerals 317 and 318 represent "AND" gate logics, the numeral 319 represents a circuit breaker trip command by the earth fault distance relay and the numeral 320 represents a permissive trip signal.

The typical directional comparison distance relay system has an earth fault distance relay and a short-circuit relay as in a typical case. The short-circuit relay may be activated even at an earth fault in a single line under some condition including the condition of reverse impedance. If the earth fault in a single line is tripped by the short-circuit relay, a three-phase trip is caused. Therefore, single phase trip by the earth fault relay is preferable at a single line short-circuit fault.

FIG. 9 is a logic diagram of an example of a trip permitting logic 306 by the short-circuit distance relay shown in FIG. 8. This logic prevents a trip by the short-circuit relay at a single earth fault case. In FIG. 9, the numeral 321 represents a set of under-voltage relays (UV-A, UV-B and UV-C) for phases A, B and C, respectively. The numeral 322 represents a set of two-phase "AND" logics which are turned on when under-voltage relays of at least two phases operate. The numeral 323 represents an "OR" gate logic which is turned on when at least one of the three two-phase "AND" logics operate.

In a typical single line fault, the reduction of the voltages in the healthy phases are small, so that two or more under-voltage relays would not be activated. Therefore, trip can be prevented even when the short-circuit relay has mal-operated in a single line earth fault case, by adding this two-phase "AND" logic condition to the trip permitting logic.

FIG. 10 shows an alternative example of a trip permitting logic shown in FIG. 9. In FIG. 10, reduction in the voltages between each pair of the lines A-B, B-C and C-A are detected, while the voltage reduction in A, B and C-phases are detected by the under-voltage relay 321 in the case shown in FIG. 9. In FIG. 10, the outputs of the three under-voltage relays 324 are input to an "OR" gate logic 323. In case of a single-line earth fault, a trip by the short-circuit distance relay is prevented, because the reduction in voltages between the lines are small.

The conventional device described above can prevent a trip in case of a mal-operation of a short-circuit relay at a one-line earth fault. However, such a device can lead to a three-phase trip by the short-circuit distance relay in case of an internal single-phase fault, if an evolving fault occurred where faults have occurred at an adjacent zone in the forward direction and at an adjacent zone in the reverse direction in a different phase simultaneously or with a time difference.

That is because the condition of phase voltage reduction in two or more phases is fulfilled when single line earth faults have occurred in the forward and the reverse adjacent ends.

In such a case, when a reverse fault has occurred and a permissive trip signal is sent out to the far end of the protected zone of the electric power transmission line, it cannot be decided whether it is a simple two-phase fault by the far end. Therefore, the far end trips in three phases.

Suppose, for example, single-line earth faults have occurred at near ends in different phases in the two lines each in a parallel electric power transmission line, earth faults in A-phase in a first line and in B-phase in a second line have occurred, then both of the two lines are tripped in three phases. That will cause a route cut, which will result in a serious damage in the power transmission system.

In a case where a time difference between an internal fault and a reverse fault of the far end exists, phase defecting state may exist when the reverse fault occurs at the far end. In such a case, so called over-reach phenomenon may occur where the earth fault relay takes the faults located further from the protected zone as a cause of its trip.

Accordingly, it is an object of the present invention to provide an improved directional comparison relay system which can select only the fault phase in the present line and trip the only one phase.

It is another object of the present invention to provide an improved directional comparison relay system which can prevent mal-operation due to over-reaching by making the operation time delayed so that the transient operation may be ignored, when a trip signal already exists or when a trip has already occurred.

BRIEF SUMMARY OF THE INVENTION

There has been provided, in accordance with an aspect of the present invention, a directional comparison distance relay system for controlling a circuit breaker installed in a parallel three-phase AC electric power transmission system, the relay system comprising: a fault detection unit including a directional distance relay for deciding whether a fault is in forward or reverse directions relative to a location of a set of transformers which detect current and voltage in the power transmission system; a short-circuit distance relay for deciding whether a fault is within a protection zone by distance calculation based on the current and voltage; a transmission unit for sending signals to and receiving signals from a neighboring relay system at an far end of the protection zone; an evolving fault detecting unit for deciding an evolving fault when a forward earth fault directional relay in a single phase and a reverse directional relay in at least one phase are in operation; and a block unit for blocking trip of a circuit breaker at a near end due to the short-circuit distance relay, and for blocking permissive trip signal to a circuit breaker at the far end, based on an operation of the evolving fault detecting unit.

There has been provided, in accordance with another aspect of the present invention, a directional comparison distance relay system for controlling a circuit breaker installed in a parallel three-phase AC electric power transmission system, the relay system comprising: a fault detection unit including a directional distance relay for deciding whether a fault is in forward or reverse directions relative to a location of a set of transformers which detect current and voltage in the power transmission system; a short-circuit distance relay for deciding whether a fault is within a protection zone by distance calculation based on the current and voltage; an under-voltage relay for detecting under-voltage based on the voltage; a transmission unit for sending signals to and receiving signals from a neighboring relay system at a far end of the protection zone; an evolving fault detecting unit for deciding an evolving fault when under-voltage relays in at least two phases and a forward earth fault directional relay only in a single phase are in operation; and a block unit for blocking trip of a circuit breaker at a near end due to the short-circuit distance relay, and for blocking permissive trip signal to a circuit breaker at the far end, based on an operation of the evolving fault detecting unit.

There has also been provided, in accordance with yet another aspect of the present invention, a directional comparison distance relay system for controlling a circuit breaker installed in a parallel three-phase AC electric power transmission system, the relay system comprising: a fault detection unit including a directional distance relay for deciding whether a fault is in forward or reverse directions relative to a location of a set of transformers which detect current and voltage in the power transmission system; a short-circuit distance relay for deciding whether a fault is within a protection zone by distance calculation based on the current and voltage; an under-voltage relay for detecting under-voltage based on the voltage; a transmission unit for sending signals to and receiving signals from a neighboring relay system at an far end of the protection zone; an evolving fault detecting unit for deciding an evolving fault when under-voltage relays in at least two phases and a reverse directional relay are in operation; and a block unit for blocking trip of a circuit breaker at a near end due to the short-circuit distance relay, and for blocking permissive trip signal to a circuit breaker at the far end, based on an operation of the evolving fault detecting unit.

There has also been provided, in accordance with yet another aspect of the present invention, a directional comparison distance relay system for controlling a circuit breaker installed in a parallel three-phase AC electric power transmission system, the relay system comprising: a fault detection unit including a directional distance relay for deciding whether a fault is in forward or reverse directions relative to a location of a set of transformers which detect current and voltage in the power transmission system; a short-circuit distance relay for deciding whether a fault is within a protection zone by distance calculation based on the current and voltage; an under-voltage relay for detecting under-voltage based on the voltage; a transmission unit for sending signals to and receiving signals from a neighboring relay system at an far end of the protection zone; an evolving fault detecting unit for deciding an evolving fault when a trip signal is output only in a single phase and a reverse directional relay are in operation; and a block unit for blocking trip of a circuit breaker at a near end due to the short-circuit distance relay, and for blocking permissive trip signal to a circuit breaker at the far end, based on an operation of the evolving fault detecting unit.

There has also been provided, in accordance with yet another aspect of the present invention, a directional comparison distance relay system for controlling circuit breakers installed in a three-phase AC electric power transmission system, the relay system comprising: a fault detection unit including a directional distance relay for deciding whether a fault is in forward or reverse directions relative to a location of a set of transformers which detect current and voltage in the power transmission system; a short-circuit distance relay for deciding whether a fault is within a protection zone by distance calculation based on the current and voltage; and a delay unit for delaying a trip command to the circuit breakers based on an operation signal from a Zone 1 element of a distance relay if the operation signal is sent when at least one of the circuit breakers is turned off.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Figure 1:
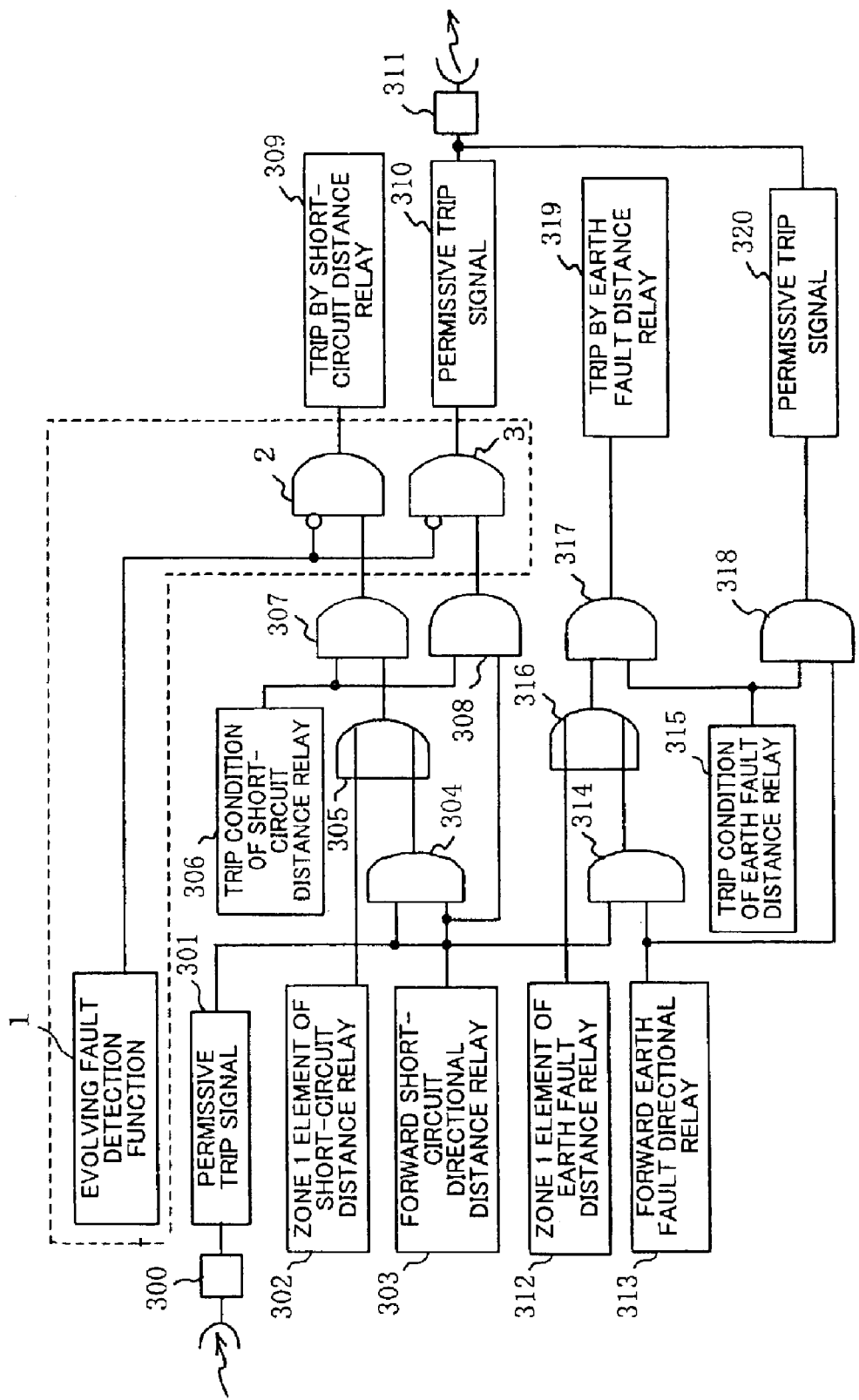
FIG. 1 is a block diagram showing an example of a directional comparison distance relay system according to the present invention.

In the following description and also in the description of background of the invention disclosed above, like reference numerals represent like elements, and redundant description may be omitted.

[First Embodiment]

The first embodiment is characterized in that a trip of a circuit breaker by the short-circuit distance relay and sending a trip allowing signal are blocked when an evolving fault has occurred in an electric power transmission system. The evolving fault is a fault which is caused by a first fault, and is caused with a delay time after the first fault. The evolving fault occurs in a phase or in a line which are different from those of the first fault.

Figure 8:
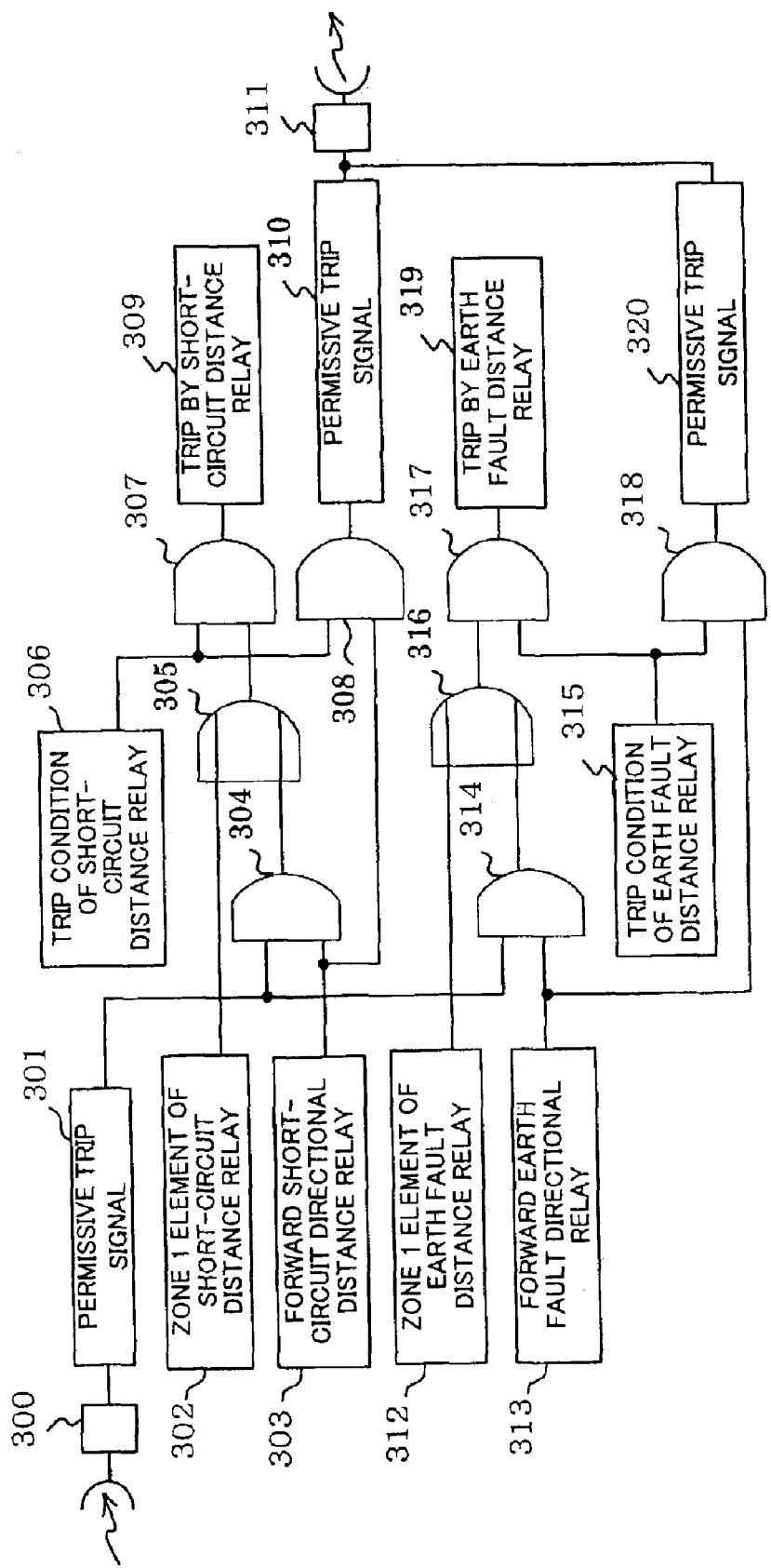
FIG. 8 is a block diagram showing a trip sequence of a conventional directional comparison distance relay system.
Figure 9:
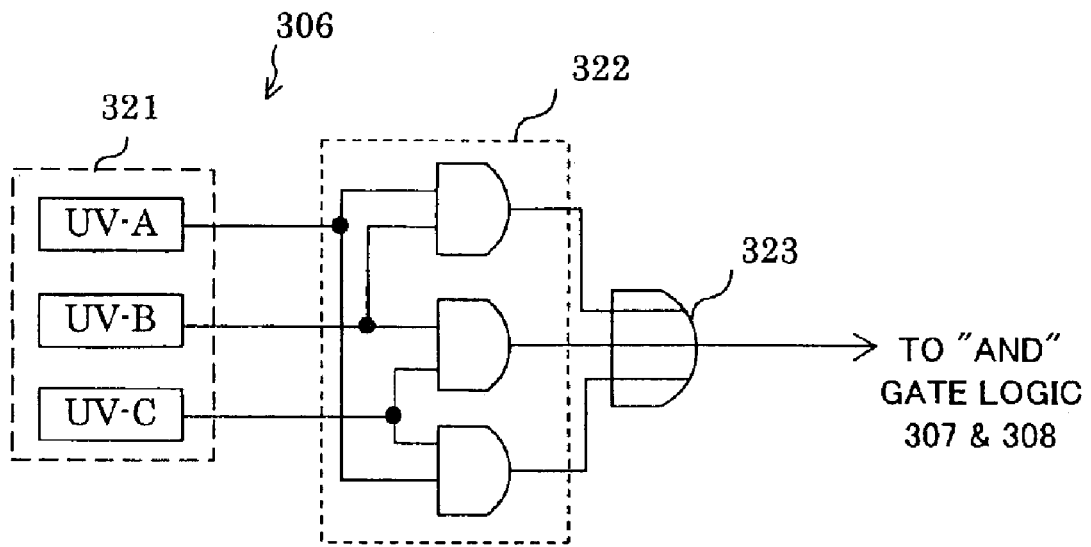
FIG. 9 is a logic diagram of a trip permitting logic by a short-circuit distance relay of a conventional directional comparison distance relay system.
Figure 10:
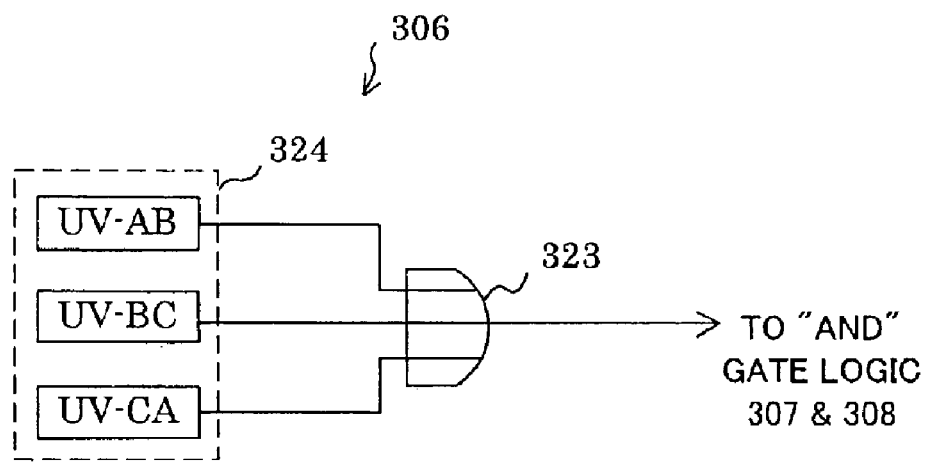
FIG. 10 is another logic diagram of a trip permitting logic by a short-circuit distance relay of a conventional directional comparison distance relay system.
Figure 11:
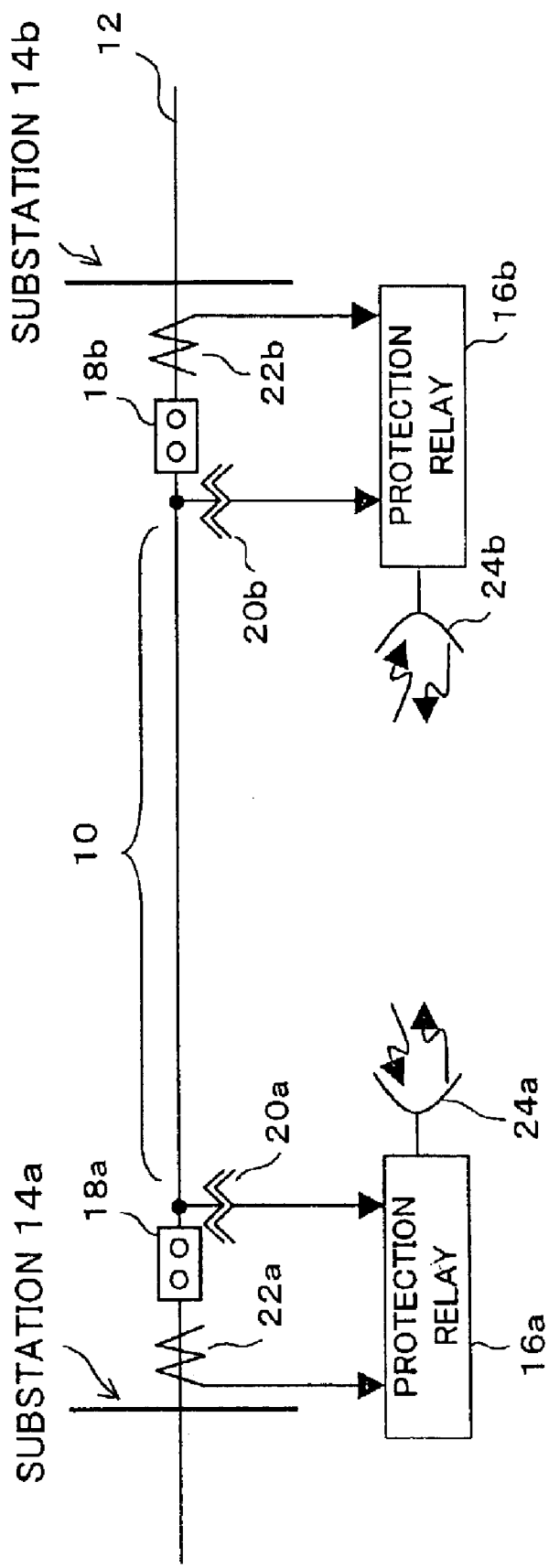
FIG. 11 is a schematic diagram of a typical parallel three-phase AC electric power transmission system with protection relay systems.

FIG. 1 is a block diagram showing the first embodiment of a directional comparison distance relay system according to the present invention. An evolving fault detection function 1 and two inhibit gate logics 2 and 3 surrounded by a dotted line have been added compared to the system shown in FIG. 8.

The evolving fault detection function 1 outputs an operational signal "1" when it has detected an evolving fault in the electric power transmission system. The output signal "1" from the evolving fault detection function 1 is entered into the inhibit gate logics 2 and 3 as an inhibiting signal. The inhibit gate logics 2 and 3 are connected to the "AND" gate logics 307 and 308 shown in FIG. 8.

As discussed above, the "AND" gate logics 307 and 308 output the operational signal "1", if the trip condition of short-circuit distance relay 306 is operated, when the Zone 1 element of short-circuit distance relay 302 is operated, or when the permissive trip signal 310 is received and the forward short-circuit directional distance relay 303 is operated.

If the evolving fault detection function 1 detects an evolving fault at this time, it outputs the signal "1". This signal is input to the inhibit gate logics 2 and 3 as an inhibit signal.

As a result, the output signals of the inhibit gate logics 2 and 3 become "0", which block tripping of the circuit breaker at the end of the present directional comparison distance relay system, and also block sending out the trip permitting signal to the far end.

Figure 2:
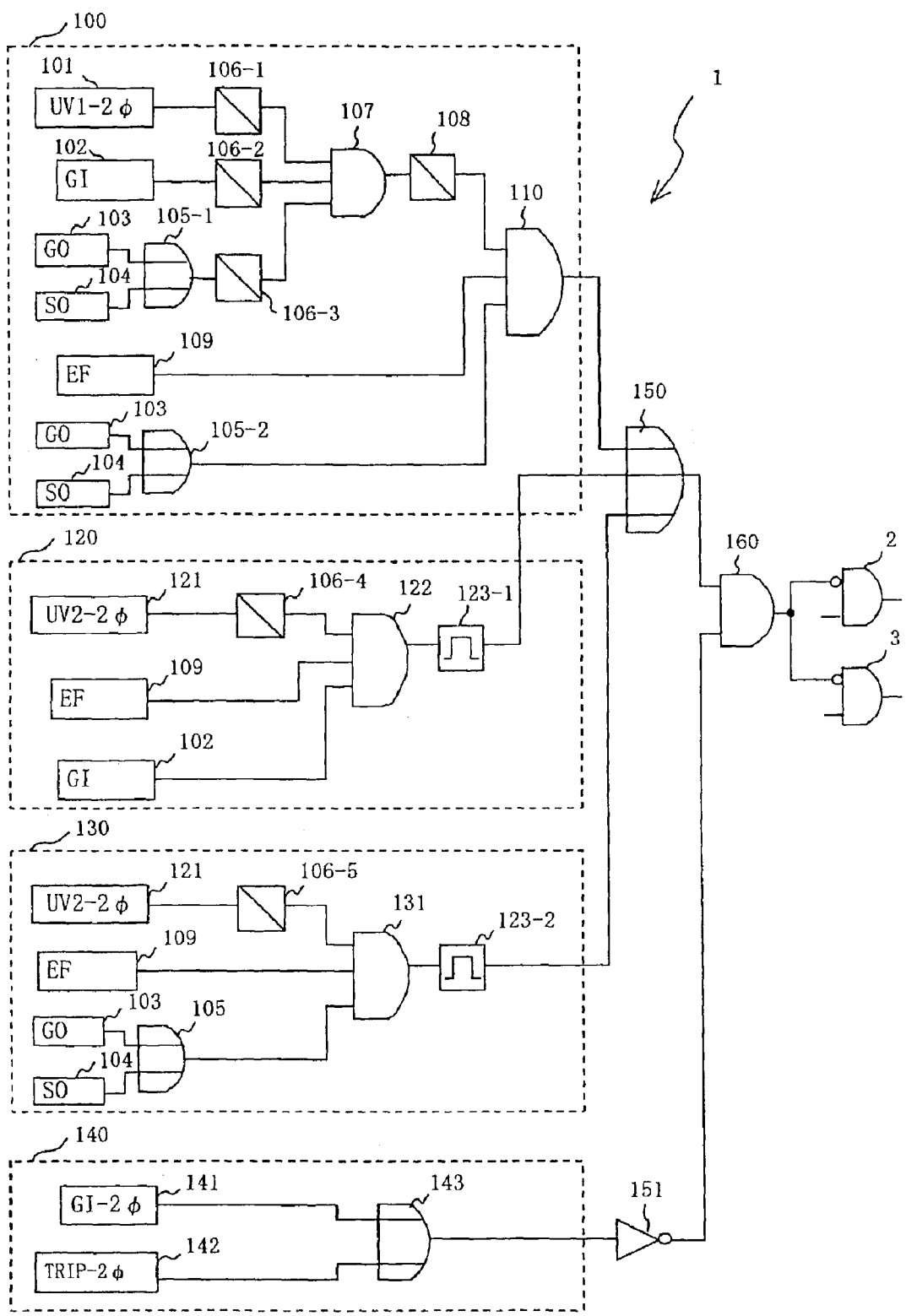
FIG. 2 is a sequence logic diagram of a first embodiment of an evolving fault detection function according to the present invention.

Now the evolving fault detection function 1 is described in detail referring to FIG. 2. The evolving fault detection function 1 has evolving fault detection logics 100, 120 and 130, and an evolving fault detection block logic 140. The evolving fault detection block logic 140 cancels the detected results of the detection logics 100, 120 and 130.

When at least one of the evolving fault detection logics 100, 120 and 130 detects an evolving fault, the output signal "1" is input to one of the input terminals of an "AND" gate logic 160 via an "OR" gate logic 150 as shown in FIG. 2.

On the other hand, if a reset condition is fulfilled in the evolving fault detection block logic 140, its output becomes "1". This output is reversed to "0" in a "NOT" gate logic 151, and then is input to the other input terminal of the "AND" gate logic 160. The output signal of the "AND" gate logic 160 is reset.

Thus, the final output turns to "1" only when an evolving fault is detected by at least one of the evolving fault detection logics 100, 120 and 130 while the evolving fault detection block logic 140 is not established. Then, the tripping of the circuit breaker at the nearest end due to the short circuit relay is blocked, and sending of the permissive trip signal to the far end is also blocked.

Now the evolving fault detection logics 100, 120 and 130 are explained in detail.

The evolving fault detection logic 100 is a logic or a circuit for reliably detecting a single-phase fault in the protection zone and a reverse fault. As shown in FIG. 2, the evolving fault detection logic 100 includes a two-phase operation of high speed under-voltage relay (UV1-2-phase) 101, a forward earth fault directional relay (GI) 102, a reverse earth fault directional relay (GO) 103 and a reverse short-circuit directional relay (SO) 104.

The two-phase operation of high speed under-voltage relay 101 detects under-voltage in two phases to be operated. When at least one of the reverse earth fault directional relay 103 and the reverse short-circuit directional relay 104 is operated, an "OR" gate logic 105-1 outputs a signal "1". The outputs of the two-phase operation of high speed under-voltage relay 101, the forward earth fault directional relay 102 and the "OR" gate logic 105-1 are input to an "AND" gate logic 107 via delay timers 106-1, 106-2 and 106-3, respectively. The delay timers 106-1, 106-2 and 106-3 make the output signals delayed to return.

The output of the "AND" gate logic 107 is input to a delay timer 108 which is similar to the delay timers 106-1, 106-2 and 106-3.

The evolving fault detection logic 100 also includes an earth fault over-current relay (EF) 109 for detecting an earth fault. The outputs of the reverse earth fault directional relay 103 and the reverse short-circuit directional relay 104 are also input to another "OR" gate logic 105-2.

The outputs of the delay timer 108, the earth fault over-current relay 109 and the "OR" gate logic 105-2 are input to an "AND" gate logic 110. The output of the "AND" gate logic 110 is input to the "OR" gate logic 150.

Now the operation of the evolving fault detection logic 100 is discussed. The two-phase operation of high speed under-voltage relay 101 is not essential for this embodiment, but two-phase fault can be reliably detected by adding this under-voltage condition. Directional relays are typically set 300 to 400% of the impedance of the protected zones, and the operational ranges are broadened. Effective detectable range of the detection logic 100 can be restricted by considering the set value of the under-voltage relay.

The purpose of using the two-phase operation of high speed under-voltage relay 101 is to detect or decide the occurrence of a fault. Therefore, other relay elements such as an over-current relay can be used alternatively for the same purpose.

If the two-phase operation of high speed under-voltage relay 101, the forward earth fault directional relay 102, and at least one of the reverse earth fault directional relay 103 and the reverse short-circuit directional relay 104 are operated, a signal of "1" is output from the "AND" gate logic 107 via the delay timers 106-1 through 106-3, which will be described below, are passed. Thus, an earth fault is detected in forward or reverse direction.

Alternatively, a distance relay with reactance element can be used in place of the forward earth fault directional relay. For example, a Zone 1 element of earth fault distance relay can be used to restrict the establish region, in place of the forward earth fault directional relay.

By setting time limits of the delay timers 106-1 through 106-3, it can be decided whether it is an evolving fault which the evolving fault detection logic 100 should detect. By inputting the operation condition of the earth fault over-current relay 109 to the "AND" gate logic 110, false detection by forward short-circuit fault can be prevented. The delay timer 108 functions to stabilize the operation by sustaining the operation and preventing instant return by the time when a cancel condition becomes TRUE after the operational condition was established.

One of the inputs to the "AND" gate logic 110 is the output of the "OR" gate logic 105-2 which is the operational condition of the reverse earth fault directional relays 103 or 104. That means that the output of the "AND" gate logic 110 is forced to become "0" when the operational condition of the reverse earth fault directional relays 103 or 104 returns to operation. Therefore, when the reverse fault is removed, the output of the evolving fault detection logic 100 becomes "0" immediately.

Now the evolving fault detection logic 120 is discussed in detail. The evolving fault detection logic 120 is a logic or a circuit for deciding an evolving fault if voltages in two phases drop when the forward earth fault directional relay becomes in operation in only a single phase.

The evolving fault detection logic 120 includes a two-phase operation of high speed under-voltage relay (UV2-2-Phase) 121. The under-voltage relay 121 operates preferably at higher speed than the under-voltage relay 101.

For example, if the under-voltage relay operation condition is used for trip permitting condition by the short-circuit relay, as in conventional relays, then the two-phase operation of high speed under-voltage relay 121 must operate in a same or higher speed. The output of the two-phase operation of high speed under-voltage relay 121 is input to an "AND" gate logic 122 via a delay timer 106-4 which has a similar function as the delay timers 106-1 through 106-3 in the evolving fault detection logic 100.

In addition to the output of the delay timer 106-4, the outputs of the earth fault over-current relay 109 and the forward earth fault directional relay 102 described above are input to the "AND" gate logic 122. The output of the "AND" gate logic 122 becomes "1" only when the all inputs are "1". The output of the "AND" gate logic 122 is input to a one-shot timer 123-1, which sustains the output of the "AND" gate logic 122 for a certain time period after the "AND" gate logic 122 has output "1" once. The output of the one-shot timer 123-1 is input to the "OR" gate logic 150.

Now the function of the evolving fault detection logic 120 is discussed. The purpose of the under-voltage relay 121 is to detect faults in two phases as in the case of the under-voltage relay 101 described above. Thus, the under-voltage relay 121 can be replaced by an over-current relay, for example, if it can detect faults in two phases and if it operates in high speed.

The purpose of inputting the output of the earth fault over-current relay 109 is to prevent erroneous operation in a short-circuit fault as in the evolving fault detection logic 100. The forward earth fault directional relay 102 in the evolving fault detection logic 120 can be replaced by a Zone 1 element of an earth fault distance relay as in the case of the evolving fault detection logic 100.

The evolving fault detection logic 120 decides an evolving fault when a forward earth fault directional relay in only a single phase is in operation and voltage lowering in two phases is detected. Then, the evolving fault detection logic 120 outputs a block signal to the circuit breaker tripping due to the short-circuit relay and a block signal to the trip permissive signal to the far end.

The reason for this operation is that the one phase where the reverse earth fault directional relay is not operated is possibly in reverse fault, and this is to be detected before the reverse earth fault directional relay starts to be operated. Thus, the evolving fault which evolves from forward to reverse direction can be detected in high speed.

Now the evolving fault detection logic 130 is discussed in detail. The evolving fault detection logic 130 is a modification of the evolving fault detection logic 120 described above. The forward earth fault directional relay 102 in the evolving fault detection logic 120 has been replaced by a reverse directional relay which includes the reverse earth fault directional relay 103 and the reverse short-circuit directional relay 104 in the evolving fault detection logic 100. The reverse directional relay in the evolving fault detection logic 130 also includes an "OR" gate logic 105-1 which is similar to the "OR" gate logic 105 and outputs "1" when at least one of the reverse earth fault directional relay 103 and the reverse short-circuit directional relay 104 in the evolving fault detection logic 100.

The output of the under-voltage relay 121 is input to a delay timer 106-5 in the evolving fault detection logic 130. The outputs of the delay timer 106-5, the earth fault over-current relay 109 and the "OR" gate logic 105 are input to an "AND" gate logic 131. Then the output of the "AND" gate logic 131 is input to the "OR" gate logic 150 via a one-shot timer 123-2.

The evolving fault detection logic 130 detects an evolving fault when a reverse earth fault directional relay is in operation only in a single phase while voltages in two phases are lowered. When the evolving fault is detected, the evolving fault detection logic 130 sends a signal for blocking the circuit breaker tripping due to the short-circuit relay and for blocking permissive trip signal to be sent to the far end.

The reason for this operation is that the one phase where the reverse earth fault directional relay is not operated is possibly in forward earth fault, and this is to be detected before the forward earth fault directional relay starts to be operated. Thus, the evolving fault which evolves from forward to reverse direction can be detected in high speed.

The other features of the evolving fault detection logic 130 are similar to those of the evolving fault detection logic 120, and repetitive discussion is not disclosed here.

Now the evolving fault detection block logic 140 is described. The evolving fault detection block logic 140 includes a two-phase operation of forward earth fault directional relay 141 and a two-phase operation of trip 142. The outputs of the two-phase operation of forward earth fault directional relay 141 and the two-phase operation of trip 142 are input to an "OR" gate logic 143. The output of the "OR" gate logic 143 is input to a "NOT" gate logic 151.

The outputs of the "OR" gate logic 150 and the "NOT" gate logic 151 are input to an "AND" gate logic 160. The output of the "AND" gate logic 160 is input to the inhibit gate logics 2 and 3 shown in FIG. 1 and is used for the trip by short-circuit distance relay 309 and for the permissive trip signal 310.

The evolving fault detection block logic 140 is a logic or a circuit for resetting the trip blocking by the short-circuit relay and the blocking of trip permission signal transmission to the far end.

Forward earth faults in two or more phases are detected by the two-phase operation of forward earth fault directional relay 141. Thus, even when the evolving fault detection logic is operated due to a two-phase earth fault in the protected zone, the operated logic can be canceled rapidly.

The two-phase operation of trip 142 can cancel the block rapidly, when the user has chosen three-phase trips for all cases, or when forced three-phase trips cannot be avoided because there is only small voltage in the phase is residual due to a fault in a defective phase condition, for example.

[Second Embodiment]

Figure 3:
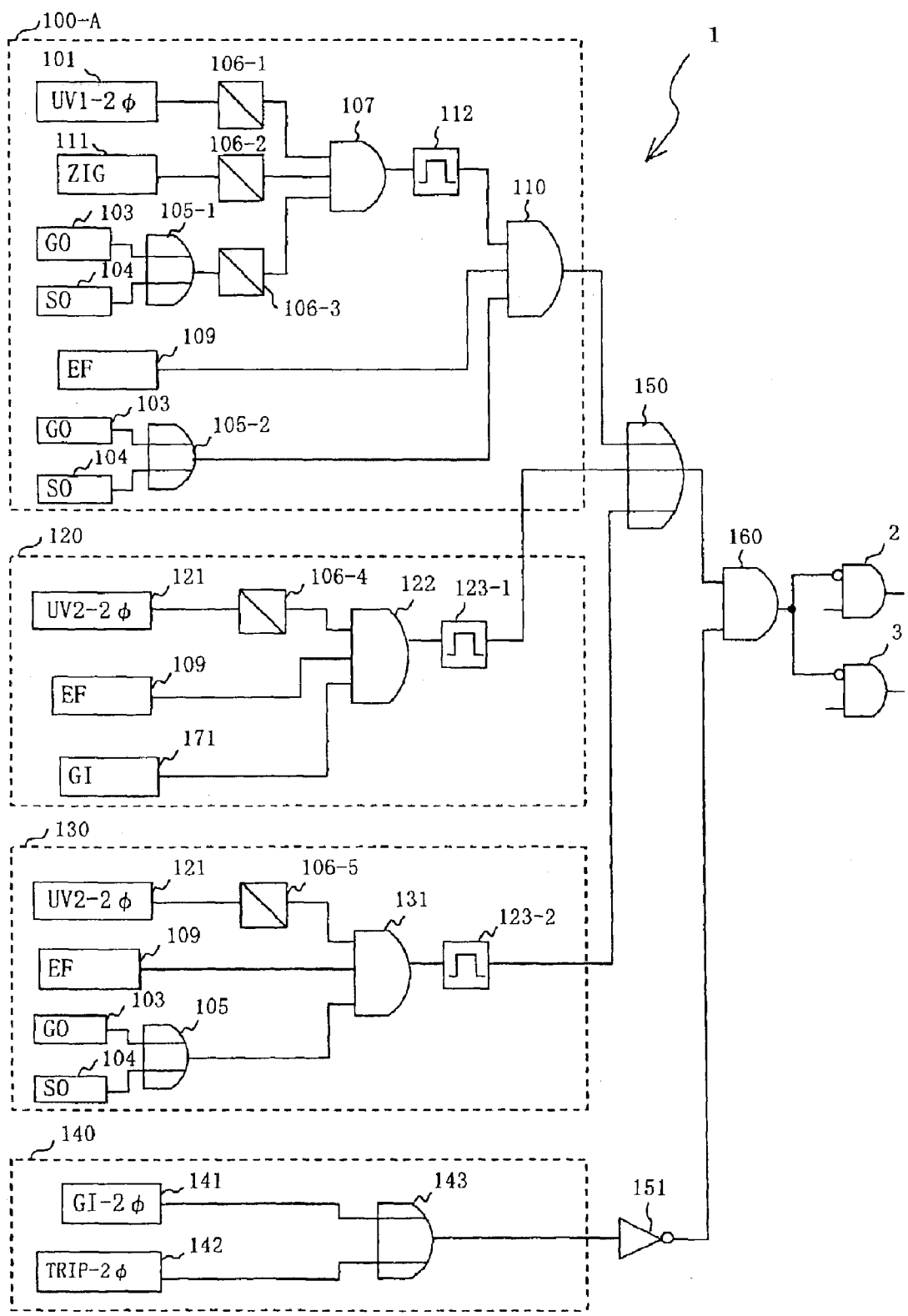
FIG. 3 is a sequence logic diagram of a second embodiment of an evolving fault detection function according to the present invention.

FIG. 3 is a sequence logic diagram of a second embodiment of an evolving fault detection function according to the present invention. This embodiment is similar to the first embodiment except that the evolving fault detection logic 100 shown in FIG. 2 has been replaced by an evolving fault detection logic 100-A. The evolving fault detection logic 100-A has a Zone 1 element of an earth fault distance relay (ZIG) 111 in place of the forward earth fault directional relay 102, and a one-shot timer 112 in place of the delay timer 108. The one-shot timer 112 sustains the output value for a certain time period regardless of the later input.

Because of the replacement of the delay timer 108 with the one-shot timer 112, the evolving fault detection logic is forced to be reset after a certain time period even when the reset condition is not fulfilled in the evolving fault detection block logic 140. Thus, perpetual operation can be avoided.

In addition, because of the replacement of the forward earth fault directional relay 102 with the Zone 1 element of the earth fault distance relay 111, the logic condition can be limited, and undesirable operation is avoided.

[Third Embodiment]

Figure 4:
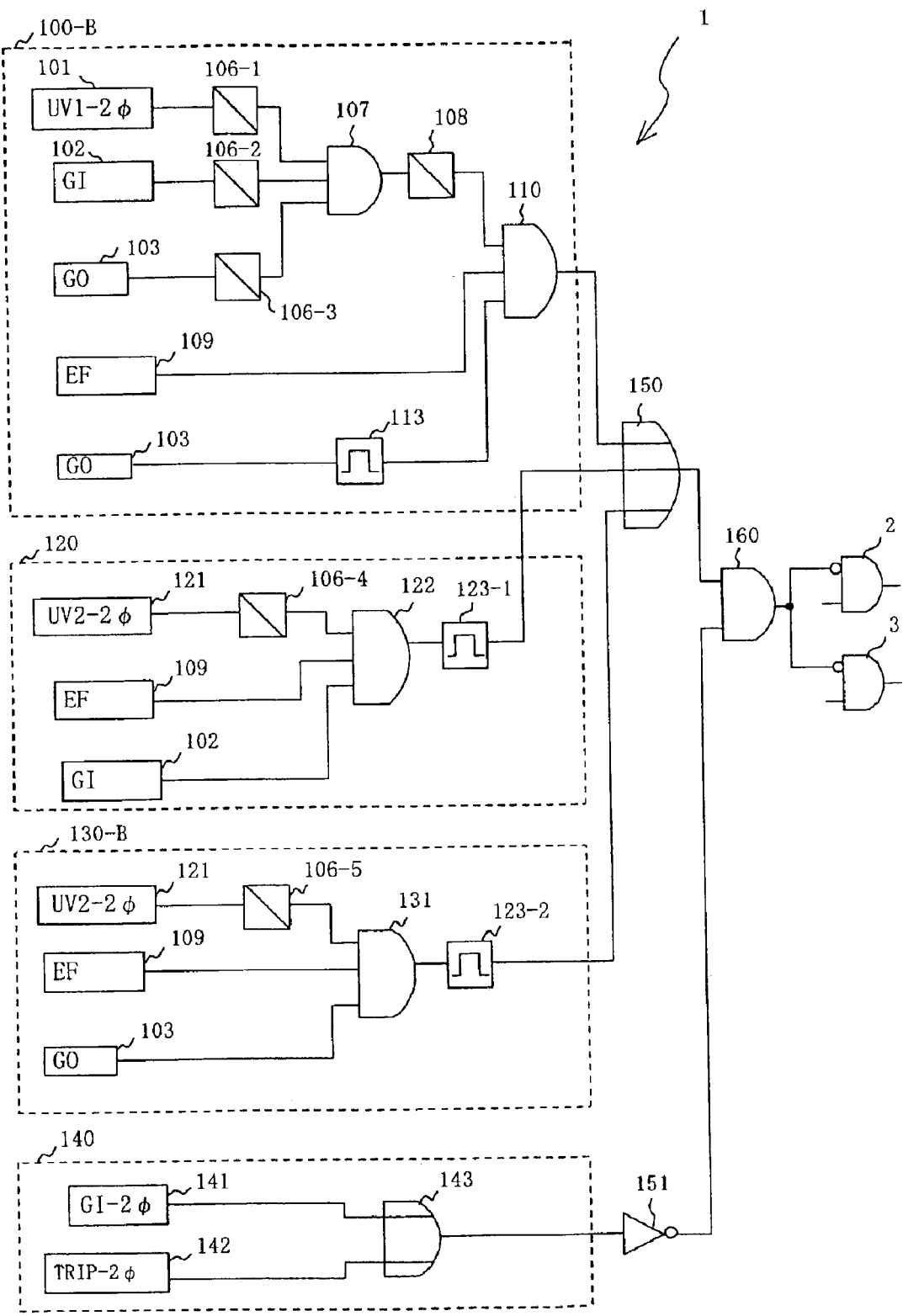
FIG. 4 is a sequence logic diagram of a third embodiment of an evolving fault detection function according to the present invention.

FIG. 4 is a sequence logic diagram of a third embodiment of an evolving fault detection function according to the present invention. This embodiment is similar to the first embodiment except that the evolving fault detection logics 100 and 130 shown in FIG. 2 has been replaced by evolving fault detection logics 100-B and 130B, respectively.

The combination of the reverse earth fault directional relay 103, the reverse short-circuit directional relay 104 and the "OR" gate logic 105-1 in the evolving fault detection logic 100 shown in FIG. 2 has been replaced by only the reverse earth fault directional relay 103 in the evolving fault detection logic 100-B. In addition, the combination of the reverse earth fault directional relay 103, the reverse short-circuit directional relay 104 and the "OR" gate logic 105-2 in the evolving fault detection logic 100 has been replaced by a combination of the reverse earth fault directional relay 103 and a one-shot timer 113 in the evolving fault detection logic 100-B. The one-shot timer 113 eliminates the output of the reverse earth fault directional relay 103 after a stipulated time period.

Furthermore, the combination of the reverse earth fault directional relay 103, the reverse short-circuit directional relay 104 and the "OR" gate logic 105 in the evolving fault detection logic 130 shown in FIG. 2 has been replaced by only the reverse earth fault directional relay 103 in the evolving fault detection logic 130-B.

These modifications are appropriate because most of the faults in electric power transmission lines in the air are single-line earth faults, and it would be sufficient for a measure for multiple faults to limit its targets to multiple faults of only earth faults.

Besides, on account of the addition of the one-shot timer 113 to the downstream of the reverse earth fault directional relay 103 in the evolving fault detection logic 100-B, the output of the reverse earth fault directional relay 103 is eliminated after a stipulated time period Thus, even when a reverse fault is not eliminated due to a failure in the circuit breaker, for example, a trip permission signal can be sent to the far end to trip the far end.

[Fourth Embodiment]

Figure 5:
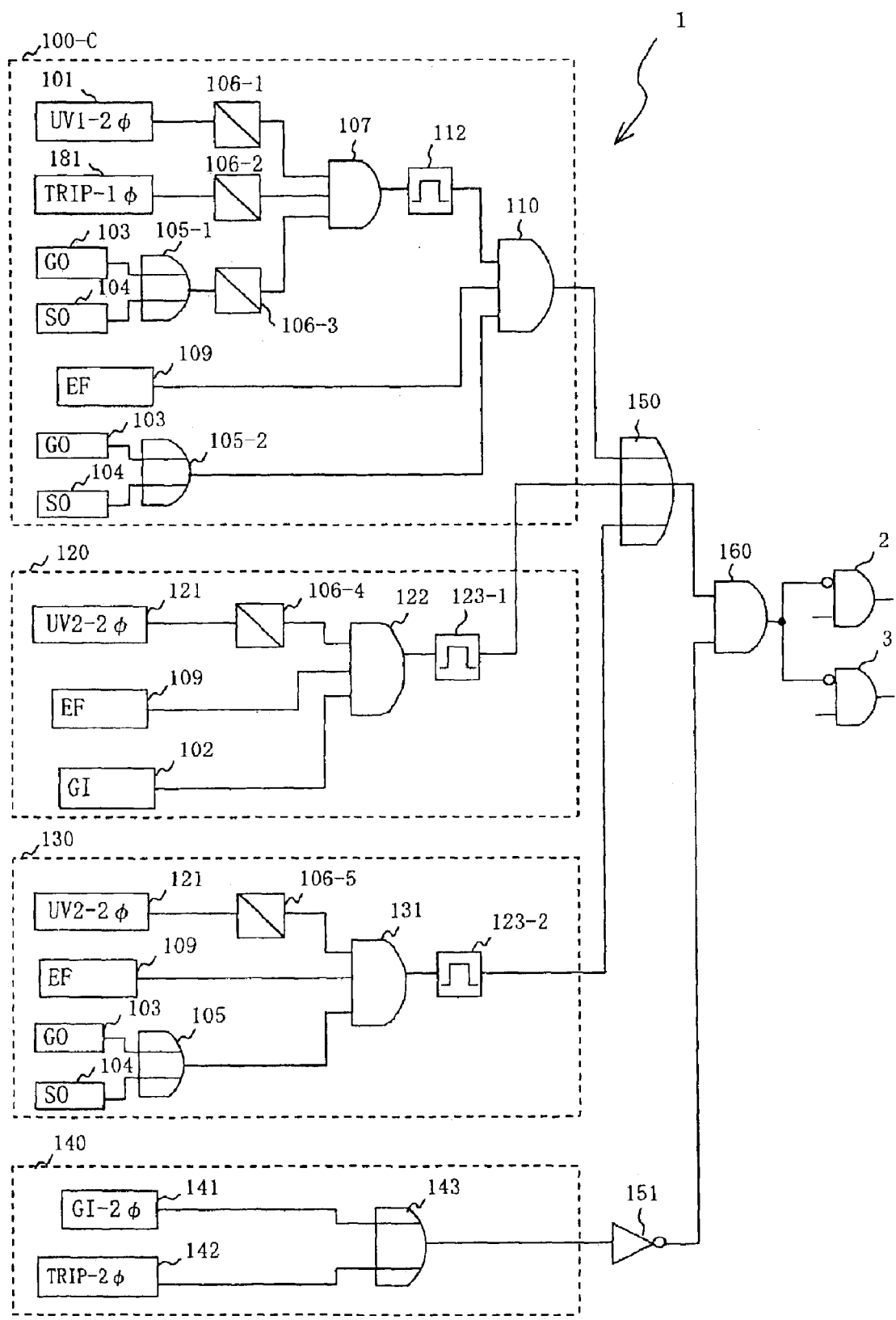
FIG. 5 is a sequence logic diagram of a fourth embodiment of an evolving fault detection function according to the present invention.

FIG. 5 is a sequence logic diagram of a fourth embodiment of an evolving fault detection function according to the present invention. This embodiment is similar to the first embodiment except that the evolving fault detection logic 100 shown in FIG. 2 has been replaced by an evolving fault detection logic 100-C. The evolving fault detection logic 100-C has a single-phase operation of trip 181 in place of the forward earth fault directional relay 102, and a one-shot timer 112 in place of the delay timer 108. The one-shot timer 112 here is similar to the one-shot timer 112 in the evolving fault detection logic 100-A shown in FIG. 3.

The single-phase operation of trip 181 outputs a signal for a single-phase trip. This is a result of detection of an internal single-phase fault. Thus, the operation of this embodiment is similar to that of the first embodiment.

[Fifth Embodiment]

Figure 6:
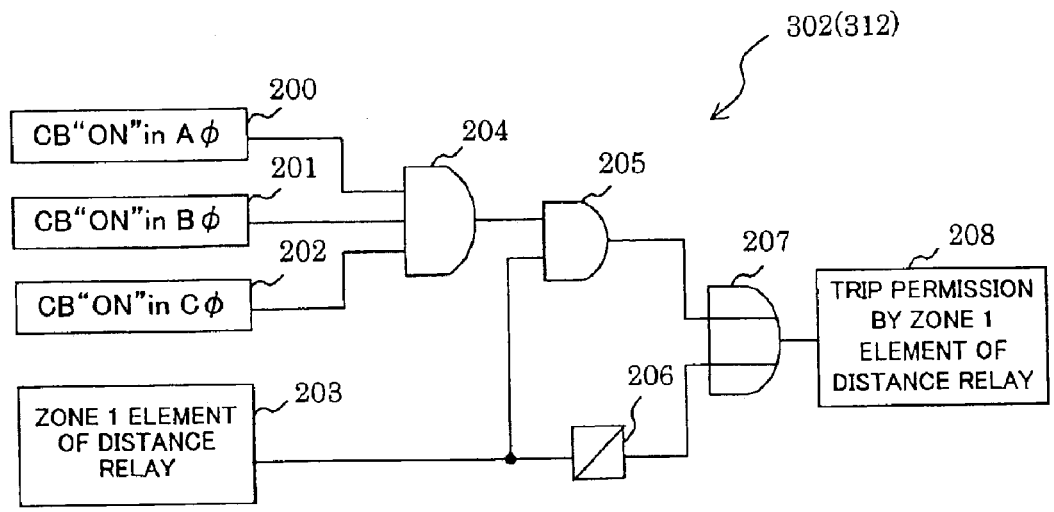
FIG. 6 is a sequence logic diagram of a fifth embodiment according to the present invention.

FIG. 6 is a sequence logic diagram of a fifth embodiment according to the present invention. FIG. 6 shows an example of the Zone 1 element of short-circuit distance relay 302 or 312. Circuit breaking conditions in Phases A, B and C 200, 201 and 202, respectively, output "1" when the circuit breakers in their respective phases are "ON".

A Zone 1 element of distance relay 203 sends a command signal for a trip. The Zone 1 element of distance relay 203 shown in a single box here typically includes earth relays and short-circuit relays for three phases each.

Outputs of the circuit breaking conditions 200, 201 and 202 are input to an "AND" gate logic 204. Then, the outputs of the "AND" gate logic 204 and the Zone 1 element of distance relay 203 are input to an "AND" gate logic 205. The output of the Zone 1 element of distance relay 203 is also input to a delay timer 206. The outputs of the "AND" gate logic 205 and the delay timer 206 are input to an "OR" gate logic 207.

The "AND" gate logic 205 is operated, when all of the circuit breakers are "ON" and a trip command has sent out in the Zone 1 element of distance relay 203. The delay timer 206 makes the trip command by the Zone 1 element of distance relay 203 delayed. The "OR" gate logic 207 outputs "1" when the output signal of the "AND" gate logic 205 or the output signal of the delay timer 206 becomes "1", which is a signal of final trip permission by the Zone 1 element of distance relay 208.

When all of the circuit breakers are "ON", the signal of final trip permission is output through a route without a delay timer, which results in an immediate trip. In other cases, the trip command is sent out with a delay because of the delay timer 206 Besides, the final trip command is not sent out if the trip command is vanished while the delay timer 206 is still counting the time.

Thus, erroneous trip due to a transient mal-operation of the distance relay during phase lacking can be prevented.

[Sixth Embodiment]

Figure 7:
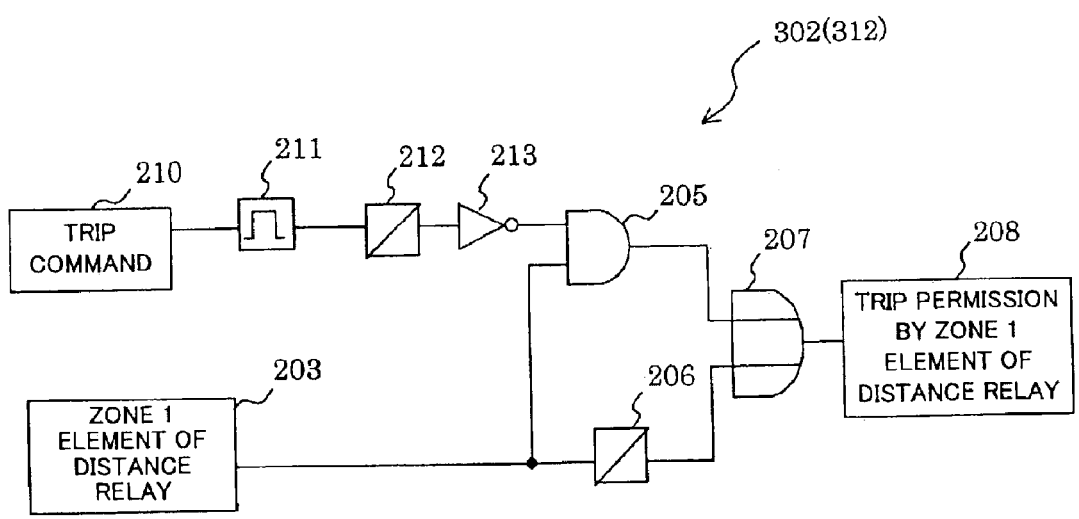
FIG. 7 is a sequence logic diagram of a sixth embodiment according to the present invention.

FIG. 7 is a sequence logic diagram of a sixth embodiment according to the present invention. This embodiment is a modification of the fifth embodiment described above. The circuit breaking conditions 200, 201 and 202 and the "AND" gate logic 204 shown in FIG. 6 have been replaced by a trip command 210, a one-shot timer 211, a delay timer 212 and a "NOT" gate logic 213.

The trip command 210 outputs "1" when a trip signal is output from the distance relays or the earth directional relays. The output of the trip command 210 is input to the one-shot timer 211 for sustaining the output for a stipulated time period. The output of the one-shot timer 211 is input to the delay timer 212 to make the trip signal to be delayed. The output of the delay timer 212 is input to the "NOT" gate logic 213 which reverses the signal and which outputs "1" when there are no trip command signals.

According to the present embodiment, the "NOT" gate logic 213 normally outputs "1" when there are no trip command signals. In this case, when the Zone 1 element of distance relay 203 becomes in operation, then a circuit breaker trip signal is output immediately.

When a trip command signal already exists, the "NOT" gate logic 213 is outputting "0". Then, the condition of the "AND" gate logic 205 is not fulfilled, and a trip command signal is output after a time delay due to the delay timer 206. The circuit breaking condition may be delayed in taking the condition of the signals. However, the trip signal do not be delayed, and stable operation can be obtained.

In the description above, any logics including relays and timers can be implemented electrically or electronically using hard-wired electric circuits or computer programs.

Numerous modifications and variations of the present invention are possible in light of the above teachings. It is, therefore, to be understood that, within the scope of the appended claims, the present invention can be practiced in a manner other than as specifically described herein.

What is claimed is:

1. A directional comparison distance relay system configured to control a circuit breaker installed in a parallel three-phase AC electric power transmission system, the relay system comprising:
   a fault detection unit including a directional distance relay element configured to decide whether a fault is in forward or reverse directions relative to a location of a set of transformers which detect current and voltage in the power transmission system;
   a short-circuit distance relay element configured to decide whether a fault is within a protection zone by distance calculation based on the current and voltage;
   a transmission unit configured to send signals to and receiving signals from a neighboring relay system at an far end of the protection zone;
   an evolving fault detecting unit configured to decide an evolving fault when a forward earth fault directional relay in a single phase and a reverse directional relay in at least one phase are in operation; and
   a block unit configured to block trip of a circuit breaker at a near end due to the short-circuit distance relay, and configured to block permissive trip signal to a circuit breaker at the far end, based on an operation of the evolving fault detecting unit.

2. The directional comparison distance relay system according to claim 1, further comprising:
   a block canceling unit configured to cancel the blocking, if forward earth fault directional relays in two phases are in operation, when the tripping of the circuit breaker at the near end is blocked due to the short-circuit distance relay and the permissive trip signal to the circuit breaker at the far end is blocked.

3. The directional comparison distance relay system according to claim 1, further comprising:
   a block canceling unit configured to cancel the blocking, if trip signals in at least two phases are output, when the trip of the circuit breaker at the near end is blocked due to the short-circuit distance relay and the permissive trip signal to the circuit breaker at the far end is blocked.

4. The directional comparison distance relay system according to claim 1, further comprising:
   a block canceling unit configured to cancel the blocking a certain time period later than the time when the trip of the circuit breaker at the near end was blocked due to the short-circuit distance relay and when the permissive trip signal to the circuit breaker at the far end was blocked.

5. A directional comparison distance relay system configured to control a circuit breaker installed in a parallel three-phase AC electric power transmission system, the relay system comprising:
   a fault detection unit including a directional distance relay element configured to decide whether a fault is in forward or reverse directions relative to a location of a set of transformers which detect current and voltage in the power transmission system;
   a short-circuit distance relay element configured to decide whether a fault is within a protection zone by distance calculation based on the current and voltage;
   an under-voltage relay element configured to detect under-voltage based on the voltage;
   a transmission unit configured to send signals, to and to receive signals from a neighboring relay system at a far end of the protection zone;
   an evolving fault detecting unit configured to decide an evolving fault when under-voltage relays in at least two phases and a forward earth fault directional relay only in a single phase are in operation; and
   a block unit configured to block trip of a circuit breaker at a near end due to the short-circuit distance relay, and configured to block permissive trip signal to a circuit breaker at the far end, based on an operation of the evolving fault detecting unit.

6. The directional comparison distance relay system according to claim 5, further comprising:
   a block canceling unit configured to cancel the blocking, if forward earth fault directional relays in two phases are in operation, when the tripping of the circuit breaker at the near end is blocked due to the short-circuit distance relay and the permissive trip signal to the circuit breaker at the far end is blocked.

7. The directional comparison distance relay system according to claim 5, further comprising:
   a block canceling unit configured to cancel the blocking, if trip signals in at least two phases are output, when the trip of the circuit breaker at the near end is blocked due to the short-circuit distance relay and the permissive trip signal to the circuit breaker at the far end is blocked.

8. The directional comparison distance relay system according to claim 5, further comprising:
a block canceling unit configured to cancel the blocking a certain time period later than the time when the trip of the circuit breaker at the near end was blocked due to the short-circuit distance relay and when the permissive trip signal to the circuit breaker at the far end was blocked.

9. A directional comparison distance relay system configured to control a circuit breaker installed in a parallel three-phase AC electric power transmission system, the relay system comprising:
a fault detection unit including a directional distance relay element configured to decide whether a fault is in forward or reverse directions relative to a location of a set of transformers which detect current and voltage in the power transmission system;
a short-circuit distance relay element configured to decide whether a fault is within a protection zone by distance calculation based on the current and voltage;
an under-voltage relay element configured to detect under-voltage based on the voltage;
a transmission unit configured to send signals to and to receive signals from a neighboring relay system at a far end of the protection zone;
an evolving fault detecting unit configured to decide an evolving fault when under-voltage relays in at least two phases and a reverse directional relay are in operation; and
a block unit configured to block trip of a circuit breaker at a near end due to the short-circuit distance relay, and configured to block permissive trip signal to a circuit breaker at the far end, based on an operation of the evolving fault detecting unit.

10. The directional comparison distance relay system according to claim 9, further comprising:
a block canceling unit configured to cancel the blocking, if forward earth fault directional relays in two phases are in operation, when the tripping of the circuit breaker at the near end is blocked due to the short-circuit distance relay and the permissive trip signal to the circuit breaker at the far end is blocked.

11. The directional comparison distance relay system according to claim 9, further comprising:
a block canceling unit configured to cancel the blocking, if trip signals in at least two phases are output, when the trip of the circuit breaker at the near end is blocked due to the short-circuit distance relay and the permissive trip signal to the-circuit breaker at the far end is blocked.

12. The directional comparison distance relay system according to claim 9, further comprising:
a block canceling unit configured to cancel the blocking a certain time period later than the time when the trip of the circuit breaker at the near end was blocked due to the short-circuit distance relay and when the permissive trip signal to the circuit breaker at the far end was blocked.

13. A directional comparison distance relay system configured to control a circuit breaker installed in a parallel three-phase AC electric power transmission system, the relay system comprising:
a fault detection unit including a directional distance relay element configured to decide whether a fault is in forward or reverse directions relative to a location of a set of transformers which detect current and voltage in the power transmission system;
a short-circuit distance relay element configured to decide whether a fault is within a protection zone by distance calculation based on the current and voltage;
an under-voltage relay element configured to detect under-voltage based on the voltage;
a transmission unit configured to send signals to and to receive signals from a neighboring relay system at a far end of the protection zone;
an evolving fault detecting unit configured to decide an evolving fault when a trip signal is output only in a single phase and a reverse directional relay are in operation; and
a block unit configured to block trip of a circuit breaker at a near end due to the short-circuit distance relay, and configured to block permissive trip signal to a circuit breaker at the far end, based on an operation of the evolving fault detecting unit.

14. The directional comparison distance relay system according to claim 13, further comprising:
a block canceling unit configured to cancel the blocking, if forward earth fault directional relays in two phases are in operation, when the tripping of the circuit breaker at the near end is blocked due to the short-circuit distance relay and the permissive trip signal to the circuit breaker at the far end is blocked.

15. The directional comparison distance relay system according to claim 13, further comprising:
a block canceling unit configured to cancel the blocking, if trip signals in at least two phases are output, when the trip of the circuit breaker at the near end is blocked due to the short-circuit distance relay and the permissive trip signal to the circuit breaker at the far end is blocked.

16. The directional comparison distance relay system according to claim 13, further comprising:
a block canceling unit configured to cancel the blocking a certain time period later than the time when the trip of the circuit breaker at the near end was blocked due to the short-circuit distance relay and when the permissive trip signal to the circuit breaker at the far end was blocked.

17. A directional comparison distance relay system configured to control circuit breakers installed in a three-phase AC electric power transmission system, the relay system comprising:
a fault detection unit including a directional distance relay element configured to decide whether a fault is in forward or reverse directions relative to a location of a set of transformers which detect current and voltage in the power transmission system;
a short-circuit distance relay element configured to decide whether a fault is within a protection zone by distance calculation based on the current and voltage; and
a delay unit configured to delay a trip command to the circuit breakers based on an operation signal from a Zone 1 element of a distance relay if the operation signal is sent when at least one of the circuit breakers is turned off.

* * * * *